April 15, 1924.
O. ZBINDEN
ELECTROMAGNETIC POWER DEVICE
Filed Nov. 1, 1920
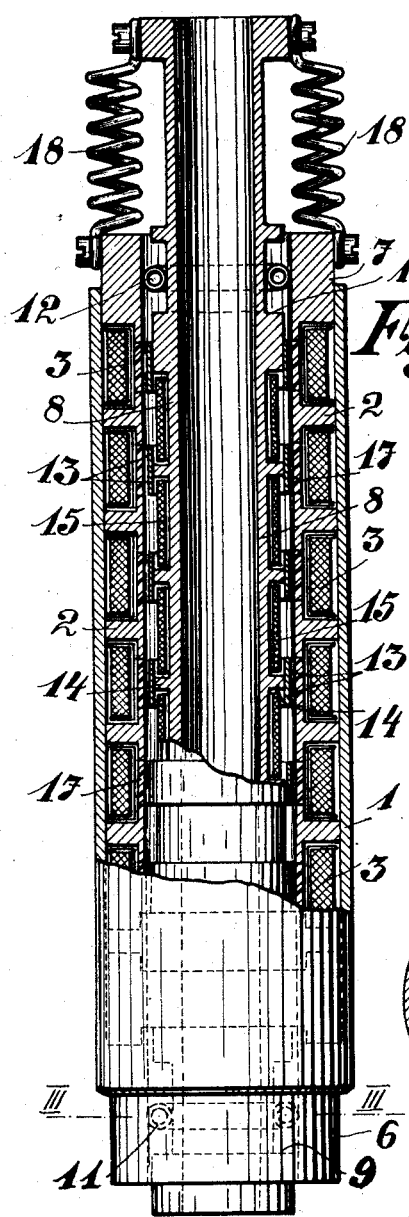
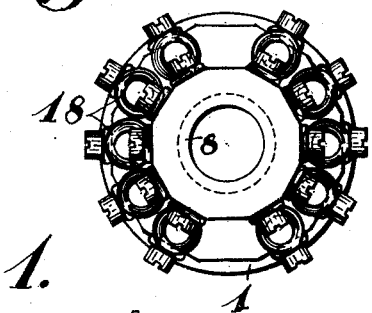
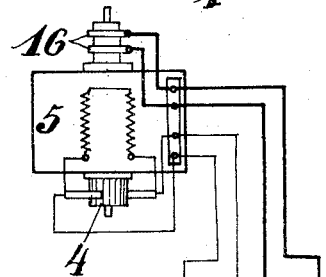
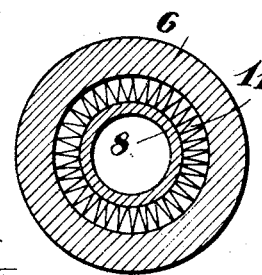
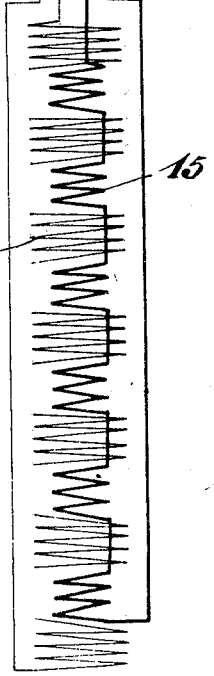
Inventor:—
Emil Zbinden
by [signature]
his attorney

Patented Apr. 15, 1924.

1,490,155

UNITED STATES PATENT OFFICE.

EMIL ZBINDEN, OF BERNE, SWITZERLAND.

ELECTROMAGNETIC POWER DEVICE.

Application filed November 1, 1920. Serial No. 421,026.

*To all whom it may concern:*

Be it known that I, EMIL ZBINDEN, a citizen of the Swiss Confederation, and residing at Berne, Switzerland, have invented certain new and useful Improvements in Electromagnetic Power Devices, of which the following is a specification.

The subject-matter of this invention is an electromagnetic device having a reciprocating armature, wherein both the stationary part and the reciprocating part, hereinafter referred to as the armature, have each a winding which is so arranged in relation to its allotted part that when current flows in each part a number of alternately opposed magnetic fields are produced.

When the one winding is connected to a source of continuous current and the other to a source of alternating current, the magnetic fields of the fixed part and the movable part, i. e., the armature, change so that the armature, which is controlled by suitable springs, reciprocates synchronously with the frequency of the alternating current.

One embodiment of the invention is illustrated by way of example in the accompanying drawing, wherein—

Figure 1 is a side elevation partly in longitudinal section showing one form of electromagnetic device according to the invention, Figure 2 is a plan thereof, Figure 3 is a horizontal section taken on the line III—III in Figure 1, and Figure 4 is a diagram of connections.

Referring to the drawing, a hollow cylindrical body or stator 1 has annular magnet pole-pieces 2 and windings 3 arranged alternately in it. The windings 3 are connected by way of a commutator 4 to a source of direct current 5 and are connected with one another in such a manner that the successive magnetic fields are of opposite direction.

The armature 8 which likewise has the form of a hollow cylinder is guided at both ends by endless coil springs 11 and 12, which serve as roller members, in rings 6 and 7 concentric with the body 1. A number of annular grooves, which are partially closed by rings 13 constituting pole-pieces and supported by carrier and spacer annuli 14, are provided for the reception of windings 15. These windings 15 which are connected by slip-rings 16 to a source of alternating current are so connected together that the successive magnetic fields are of opposite direction.

The distance from middle to middle of the windings 15, i. e., the pole-pitch, is equal to that from middle to middle of the windings 3. Further, the breadth of the pole rings 13 is approximately equal to the breadth of the gap between the pole-pieces 2 filled with non-magnetic material 17.

Between the armature and the stator is interposed a plurality of relatively small coil springs 18, arranged in cage formation around the protruding armature end. They are thus easily accessible and are readily demountably secured at their upper and lower extremities to the upper ends of the stator and the armature respectively. Incidentally these springs serve to keep the electro-receptive elements in their relative position of rest, with the stator and armature fields in staggered relation and the insulating bridge annuli between the stator fields and the armature annuli faces in registering opposition.

Owing to the alternate attraction and repulsion of the magnetic fields which are produced by the windings 3 and 15, and which in the rest position of the armature are displaced relatively to one another by an amount equal to half the pole-pitch, the armature is shifted in the direction of the axis of the cylinder 1 the distance of half the pole-pitch, that is to say until the magnetic fields register with one another.

By suitable selection of the springs 18 the natural period of oscillation of the armature can be tuned so that at the moment when the alternating current flowing in the winding 15 changes its direction, the magnetic fields of like direction register with one another and the armature shifts a distance equal to the pole-pitch in the opposite direction in consequence of the repulsion of the magnetic fields. Owing to the above-mentioned tuning of the armature the magnetic fields of like direction will register at the moment when the alternating current again changes in direction, so that the play just described is repeated and the armature reciprocates synchronously with the periodicity of the alternating current.

This reciprocation of the armature can be employed for various purposes, for example for actuating hammers, chisels, drills and the like.

It will be understood that the alternating current may be supplied to the outer coils in the cylinder 1 instead of through the armature coils, and the direct current may be supplied to the armature coils without departing from the scope of the invention as defined in the claims.

I claim:

1. In a reciprocating electrical power device of the character set forth, in combination, a stator, an armature axially reciprocable therein, and a plurality of springs parallelly axially interposed between said stator and said armature in cage formation.

2. In a reciprocating electrical power device of the character set forth, in combination with a stator, a relatively axially reciprocable armature, and a plurality of cylindrically coiled springs, parallelly axially equidistantly interposed between said stator and said armature in cage formation and adapted to be controllingly active in both directions of relative reciprocal displacements of said armature.

3. In a reciprocating electrical power device of the character set forth, in combination, a stator, an armature axially reciprocable therein, and a plurality of axially directed cylindrically coiled control springs, their extremities respectively rigidly secured to said stator and said armature, and said springs arranged in cage formation.

4. In a reciprocating electric power device operated by variations of magnetism in one or the other element of the device, in combination, a stator, comprising an outer shell, annular pole pieces of T-shaped cross-section extending inwardly from said shell, insulating bridge annuli connecting the several annular cross-portions of said T-pieces flush therewith, field coils in the annular chambers thus formed, and means for electrically connecting said field coils to one another and to a source of current; an armature axially reciprocable in said stator, comprising a cylindrical stem, annular T-pole-pieces extending outwardly from said stem, coils in the annular chambers thus formed, and means for electrically connecting said several armature coils to one another and to a source of electricity, the respectively opposed faces of said stator T-annuli, of said insulating annuli, and of said armature T-annuli all being of substantially the same width, and the said insulating annuli in normal position of the parts registering with the respective armature T-annuli, and each of said armature coils extending substantially over one-half of two adjacent stator coils; annular coil-spring bearings between said stator and said armature; and a plurality of cylindrically coiled control springs longitudinally parallelly interposed between said stator and said armature.

In testimony whereof, I affix my signature in the presence of two witnesses.

EMIL ZBINDEN.

Witnesses:
HEINRICH RINDEKNECHT,
F. COMPUCHE.